US009043825B2

(12) United States Patent
Mountanos et al.

(10) Patent No.: US 9,043,825 B2
(45) Date of Patent: May 26, 2015

(54) CONTENT CARRIED RATINGS BASED CONTROL

(75) Inventors: Pete Mountanos, Redmond City, CA (US); Anand Ramasubramanian, Pleasanton, CA (US); Grant Mohr, Burlingame, CA (US); Eduardo Takahashi, Redmond, WA (US); Donal Toomey, San Francisco, CA (US)

(73) Assignee: Microsoft Technology Licensing, LLC

( * ) Notice: Subject to any disclaimer, the term of this patent is extended or adjusted under 35 U.S.C. 154(b) by 77 days.

(21) Appl. No.: 13/596,091

(22) Filed: Aug. 28, 2012

(65) Prior Publication Data
US 2014/0068652 A1    Mar. 6, 2014

(51) Int. Cl.
| H04N 7/16 | (2011.01) |
| H04N 21/854 | (2011.01) |
| H04N 21/454 | (2011.01) |
| H04N 21/8352 | (2011.01) |
| H04N 21/845 | (2011.01) |
| G11B 27/00 | (2006.01) |

(52) U.S. Cl.
CPC ..... *H04N 21/85406* (2013.01); *H04N 21/4542* (2013.01); *H04N 21/8352* (2013.01); *H04N 21/8456* (2013.01); *G11B 27/00* (2013.01)

(58) Field of Classification Search
CPC ............ H04N 21/435; H04N 21/4542; H04N 21/8352; H04N 21/8456; H04N 21/85406
USPC ..................................................... 725/27–29
See application file for complete search history.

(56) References Cited

U.S. PATENT DOCUMENTS

| 5,382,983 | A | 1/1995 | Kwoh et al. |
| 5,583,576 | A | 12/1996 | Perlman et al. |
| 7,690,012 | B2 | 3/2010 | Luehrs |
| 7,694,319 | B1 | 4/2010 | Hassell et al. |

(Continued)

FOREIGN PATENT DOCUMENTS

| EP | 0720369 A2 | 7/1996 |
| WO | 02/17634 A2 | 2/2002 |

(Continued)

OTHER PUBLICATIONS

Jason., "TV Blanket", Retrieved at <<http://www.tvblanket.com/tv-parental-control/>>, Sep. 19, 2010, pp. 7.

(Continued)

*Primary Examiner* — Randy Flynn
(74) *Attorney, Agent, or Firm* — Bryan Webster; Micky Minhas (57) ABSTRACT

Example apparatus and methods concern selectively accepting or rejecting content based on ratings identifier information included in the content. Example apparatus and methods facilitate identifying a content fragment (e.g., f-MP4 fragment) to be rejected based on an identifier located in the fragment rather than information located in some external source (e,g., Event Information Table (EIT)). One example method includes identifying a fragment based on a ratings identifier encoded as a universally unique identifier (UUID) in the fragment and then selectively accepting or rejecting the fragment based on the rating. Rather than rely only on a predicted start time, a predicted end time, a predicted source, and a pre determined coarse-grained rating, example apparatus and methods may be better prepared to account for unanticipated start times, ending times, schedule changes, and source changes, and may provide finer grained user control based on ratings carried in content.

9 Claims, 8 Drawing Sheets

(56) References Cited

U.S. PATENT DOCUMENTS

| | | | |
|---|---|---|---|
| 8,055,242 B2* | 11/2011 | Park et al. | 725/28 |
| 8,171,508 B2 | 5/2012 | Beaunoir et al. | |
| 8,782,268 B2* | 7/2014 | Pyle et al. | 709/231 |
| 2002/0090203 A1 | 7/2002 | Mankovitz | |
| 2003/0012548 A1* | 1/2003 | Levy et al. | 386/46 |
| 2004/0250272 A1* | 12/2004 | Durden et al. | 725/25 |
| 2007/0110389 A1* | 5/2007 | Hayashi et al. | 386/52 |
| 2009/0043906 A1* | 2/2009 | Hurst et al. | 725/40 |
| 2010/0031283 A1 | 2/2010 | Kageyama et al. | |
| 2010/0185854 A1* | 7/2010 | Burns et al. | 713/165 |
| 2010/0232758 A1* | 9/2010 | Cook et al. | 725/28 |
| 2011/0078717 A1* | 3/2011 | Drummond et al. | 725/14 |
| 2011/0138409 A1* | 6/2011 | Svensson et al. | 725/25 |
| 2011/0299586 A1 | 12/2011 | Odlund et al. | |
| 2011/0302618 A1* | 12/2011 | Odlund et al. | 725/109 |
| 2012/0023251 A1* | 1/2012 | Pyle et al. | 709/231 |
| 2012/0159530 A1* | 6/2012 | Ahrens et al. | 725/25 |
| 2012/0272281 A1* | 10/2012 | Ha et al. | 725/110 |
| 2013/0239145 A1* | 9/2013 | Broome et al. | 725/41 |

FOREIGN PATENT DOCUMENTS

| | | |
|---|---|---|
| WO | 02/089473 A1 | 11/2002 |
| WO | 2012041188 A1 | 4/2012 |

OTHER PUBLICATIONS

"International Search Report & Written Opinion for PCT Patent Application No. PCT/US2013/055505", Date: Nov. 21, 2013, Filed Date: Aug. 19, 2013, 11 Pages.

"Universal Mobile Telecommunications System (UMTS): LTE; Transparent end-to-end Packet-switched Streaming Service (PSS); Progressive Download and Dynamic Adaptive Streaming over HTTP (3GP-DASH) (3GPP TS 26.247 version 10.1.0 Release 10)", Technical Specification, Jan. 2012, 144 Pages.

* cited by examiner

|  | 410 | 420 | 430 | 440 | |
|---|---|---|---|---|---|
| 10 Mbps | RatingsID MPAA R | RatingsID MPAA R | RatingsID MPAA G | RatingsID MPAA R | 4050 |
| 1 Mbps | RatingsID MPAA R | RatingsID MPAA R | RatingsID MPAA G | RatingsID MPAA R | 4060 |
| 100 Kbps | RatingsID MPAA R | RatingsID MPAA R | RatingsID MPAA G | RatingsID MPAA R | 4070 |
| 10 Kbps | RatingsID MPAA R | RatingsID MPAA R | RatingsID MPAA G | RatingsID MPAA R | 4080 |
| 1 Kbps | RatingsID MPAA R | RatingsID MPAA R | RatingsID MPAA G | RatingsID MPAA R | 4090 |

CONTENT CARRIED RATINGS BASED CONTROL

BACKGROUND

The amount and variety of content that is available on television, on the Internet, and via other delivery mechanisms continues to grow. Not all content may be appropriate for all audiences. A user (e.g., parent) may be interested in controlling what content another user (e.g., child) is allowed to see. Additionally, a user (e,g., consumer) may be interested in controlling the content to which they expose themselves. For example, a user may have preferences concerning violence, sex, subject matter, language, or other issues. Conventionally, a user may have relied on ratings information that describes content to decide whether to view content. This ratings information may have been provided in an external guide (e.g., weekly television guide), in a first portion of a stream (e.g., first minute of a movie), on a label (e.g., DVD (digital video disk) cover), or in other locations. Conventional ratings may have attempted to account for some of these issues through industry standard designations (e.g., NC17, R, PG, G). However, conventional ratings based control may have been too coarsely grained and may have been based on a combination of factors that may not have guaranteed desired discretion. Therefore, a user may not have been able to insure that they or their child would not be exposed to undesirable content.

Conventional automated approaches to ratings based control may have employed V-Chip technology to analyze XDS (extended data services) ratings information. However; automated V-Chip approaches based on XDS ratings required the presence of a V-chip decoder in a receiving device or in some device in a reception stream. V-chip based control may have been inadequate because some reception devices, including televisions, smart phones, and other mobile devices may not have V-Chip decoders. V-chip refers to technology used in television receivers that allows blocking programs based on program ratings. V-chip technology may be based on the vertical blanking interval in the television signal. For example, V-Chip technology may rely on line 21 of a broadcast signal's vertical blanking interval. The vertical blanking interval can be used to transmit a code in the broadcast signal. The code may provide a score that may be compared to a ranking in a numerical rating system that considers, sex, violence, language, and other attributes. If the received content is outside the level configured by the user, then the content may be blocked. If the received content is inside the level configured by the user, then the content may be received. One example numerical rating system is the XDS protocol. The XDS protocol is codified in Electronic Industries Alliance standard CEA-608-E. The XDS protocol involves providing ancillary data (e.g., metadata) contemporaneously with content (e.g., analog television, NTSC (National Television System Committee) video signal).

Traditional ratings based control solutions may have relied on ratings information provided in an electronic program guide and may have relied on content being delivered at the advertised time on the advertised channel or from an expected source. A time based system may have required adequate time synchronization between a content provider and a content receiver. Time synchronization may have been required so that when ratings information changes on program boundaries the content receiver will honor the ratings change instantly. Programming guide, time and channel based systems may have been subverted or simply frustrated when the time on a display device did not match the time of a providing device. Schedule changes and start/stop changes due, for example, to one program running long or short, may also have frustrated these approaches. A live program that ran over time and spilled over into an "allowed" time period may have exposed a viewer to undesired content. Some traditional approaches attempted to account for these time based frustrations using an event information table (EIT). However, some content may not have had an EIT available, and even if the EIT was available, clock drift or other time alignment issues may have frustrated these approaches. Other time alignment issues may be present in network DVR (digital video recorder) or other time-shifting scenarios where the consumer time does not match against provider time.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter, Example apparatus and methods facilitate user discretion control using ratings data carried with content rather than relying on separately available data (e.g., ETI guide) or relying on time, channel, or source control. Example apparatus and methods may receive a fragmented MPEG-4 (f-MP4) fragment and determine whether to reject the fragment, or to allow the fragment to be received, to be displayed, or to be recorded based, at least in part, on the value of a ratings identifier associated with the f-MP4 fragment. In one embodiment, the MP14 ISO/IEC14496-12 box structure for a fragment may be configured to include a universally unique identifier (UUID) field that is configured to store a ratings identifier. The ratings identifier may be richer than conventional XDS score based systems. For example, the ratings identifier may have information concerning multiple attributes (e.g., sex, violence, language, subject matter). In embodiments, the ratings identifier may include multiple pieces or types of ratings information. For example, the ratings identifier may include MPM ratings, television ratings, international ratings, and other ratings. Example apparatus and methods may select fragments to accept or block using this ratings identifier. In one embodiment, rejection or acceptance may be determined solely based on the ratings identifier. For example, all content falling above a ratings threshold may be blocked and all content falling below the ratings threshold may be accepted. In other embodiments, rejection or acceptance may be determined based on the ratings identifier and a combination of other factors including, but not limited to, start time, stop time, and source. For example, content falling above a ratings threshold that is received during a certain time window may be blocked and content falling below a ratings threshold that is received during a certain time window may be accepted. In different examples, the methods may be practiced on apparatus including, but not limited to, televisions, digital video recorders, computers, laptop computers, tablet computers, personal electronic devices, and smart phones. In different examples, the methods may be practiced on the receiving device or may be provided as a service (e.g., cloud service).

Example apparatus and methods facilitate controlling rejection or acceptance in real time or in delayed time. In one embodiment, a high bandwidth reception stream may be monitored for fragments that are streaming live and that have an allowed ratings identifier. In another embodiment, buffers in which fragments have been stored may be examined to locate acceptable fragments. The buffers may be examined inside or outside a predicted delivery time. In different embodiments, the buffers may be scanned in response to different actions. For example, buffers may be scanned in response to a user action, may be scanned periodically, may be scanned when a transition from a first ratings level to a second ratings level is detected, may be scanned as a scheduled event, or may be scanned in response to other events.

Example apparatus and methods facilitate specific control or opportunistic control. In one embodiment of specific control, a specific program from a specific source with a specific rating is allowed during a target window period of time based on the ratings identifier. In this embodiment, a high bandwidth reception stream may be monitored for the desired content and receipt may be rejected or allowed as controlled by the ratings identifier. In one embodiment of opportunistic control, a specific program may be blocked from all available sources at all times based on the ratings identifier. In this embodiment, a low bandwidth reception stream may be monitored for acceptable or unacceptable content. When an acceptable ratings identifier is detected on the low bandwidth reception stream, a high bandwidth reception stream may be allowed to be tuned or recorded. In a different embodiment, when an unacceptable ratings identifier is identified on a lower bandwidth stream, then higher bandwidth streams may be prevented from being tuned or recorded. This embodiment may include verifying that the two different reception streams are synchronized on, for example, MP4 fragment boundary alignment, or otherwise. In different embodiments, being synchronized may include being received at the same time, or being received at known offset times. For example, corresponding fragments in a low-resolution stream may be 1 f-MP4, 100 ms, or some other intervals ahead of or behind fragments in a high-resolution stream.

Analyzing data that is packaged or included with a fragment facilitates addressing time based frustrations that arise from propagation delay, DVR window sizes, clock drift, time zone, and other issues. Time zone information may be an increasing issue with the widespread use of mobile players where content is watched in a time zone other than the time zone for which the control was intended.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
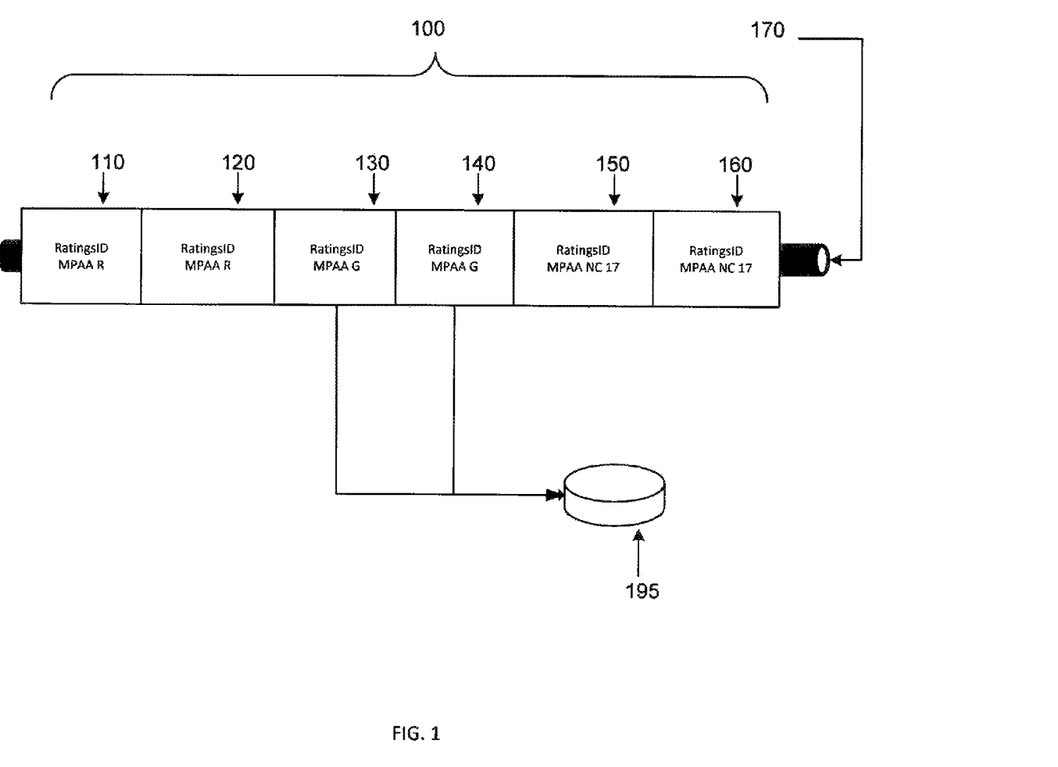
FIG. 1 illustrates an example stream of fragments.

FIG. 1 illustrates an example stream 100 of fragments. Stream 100 includes fragments 110, 120, 130, 140, 150, and 160. While six fragments are illustrated, a stream may include a much greater number (e.g., hundreds, thousands, tens of thousands) of fragments. Fragments may store, for example, two seconds of video content. In one example, corresponding fragments may include the same content but at different quality levels.

Stream 100 may be received on, for example, an Ethernet connection 170. While an Ethernet connection 170 is illustrated, stream 100 may be received on other connections. A connection may be configured to present content from a number of sources (e.g., television, FM radio, AM radio, satellite). Different sources may have different bandwidths. While multiple sources may be available, to accommodate bandwidth consumption constraints, Ethernet connection 170 may be configured to receive, at different points in time, content from less than all the available sources. The Ethernet connection 170 may be programmed by, for example, a receiving device 195. The receiving device 195 may be, for example, a computer, a laptop computer, a personal electronic device, a tablet computer, a smart phone, or other device. Multiple sources may be available from, for example, a providing device 105.

Fragments 110 and 120 are associated with content whose ratings identifier is MPAA R. MPAA refers to Motion Picture Association of America. Fragments 110 and 120 illustrate this ratings identifier as being a field titled RatingsID. While RatingsID is illustrated, other fields with other names may be employed. Fragments 110 and 120 may represent "boundary" fragments, and therefore a number of fragments having the ratings identifier MPAA R may be received between fragments 110 and 120.

Similarly, fragments 130 and 140 are associated with content whose ratings identifier is MPAA G, and fragments 150 and 160 are associated with content whose ratings identifier is MPAA NC 17. Receiving device 195 may be configured to receive content rated MPAA G and may be configured to reject anything rated higher (e.g., R, NC 17). Therefore, fragments 110 and 120 will not be accepted, fragments 130 and 140 will be accepted, and fragments 150 through 160 will be rejected. In one embodiment, fragments whose ratings identifiers do not match an acceptable threshold may be rejected. In another embodiment, even though fragments 130 and 140 may not begin and end at an expected start and stop time and may not appear from an expected source, fragments 130 and 140 may still be rejected. While MPAA ratings are illustrated, other, finger-grained ratings information may be provided, While a single ratings identifier is illustrated, two or more ratings identifiers may be carried by a fragment.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 2:
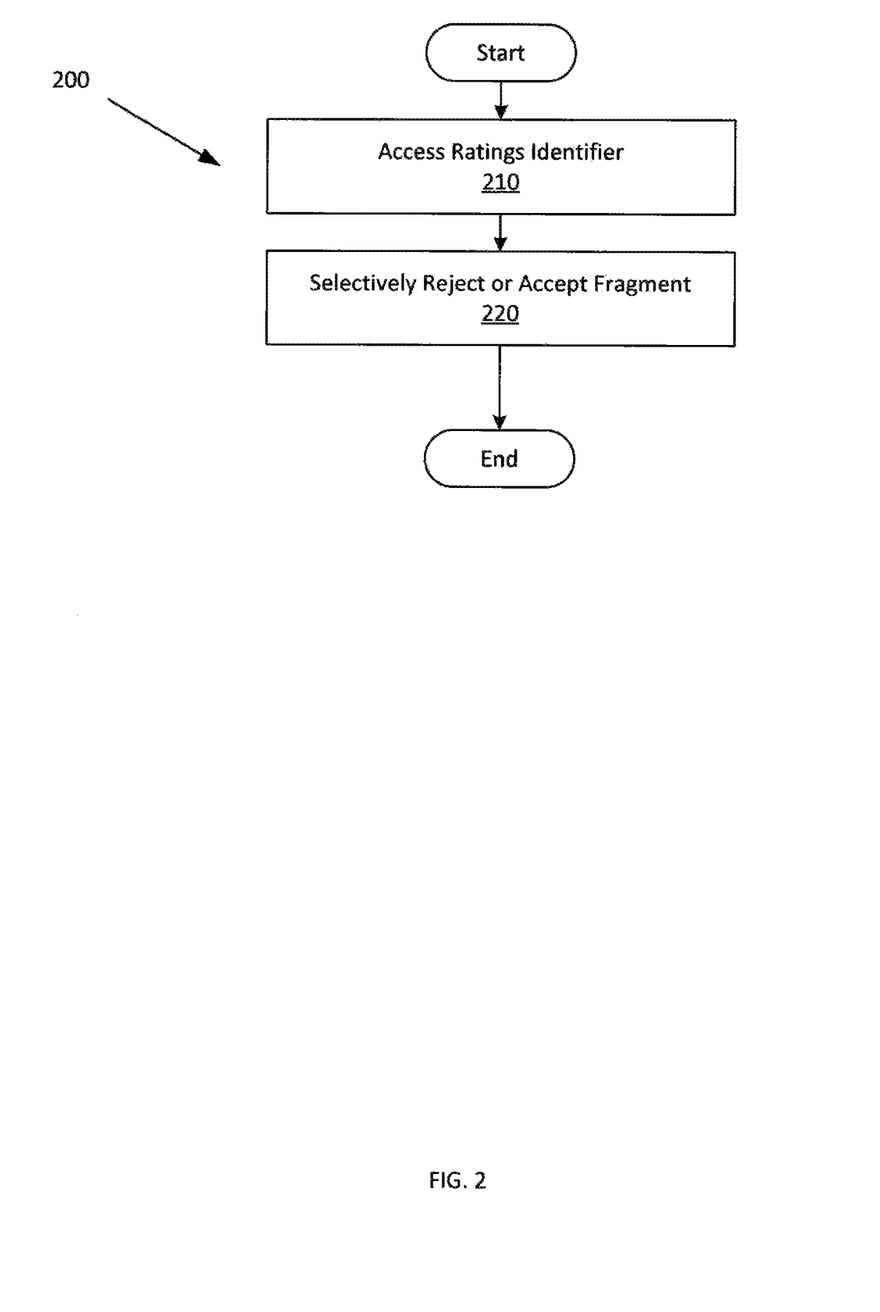
FIG. 2 illustrates an example method associated with content carried ratings based control.

FIG. 2 illustrates an example method 200 associated with ratings identifier based recording. Method 200 includes, at 210, accessing a ratings identifier in a fragment. In one embodiment, the fragment may be a fragmented MPEG-4 (f-MP4) fragment. The fragment may be analyzed for selective acceptance or rejection based, at least in part, on a ratings identifier encoded as a universally unique identifier (UUID) in the fragment. While a conventional rating may be, for example, G, PG, R, NC-17, example ratings may not be so limited. Consider a 64 bit UUID. Eight bits may be allocated to describe violence (e.g., type, level, target), eight bits may be allocated to describe language (e.g., subject matter, profanity, tone), eight bits may be allocated to describe nudity (e.g., art-based, pornography-based), eight bits may be allocated to describe subject matter (e.g., war, documentary), and other bits may be allocated to describe other attributes of the content. Thus, a fine grained control may be exercised on one attribute or on a combination of attributes. Encoding the ratings information in the fragment facilitates mitigating disconnects between the information and the content. While a Universally Unique Identifier (UUID) is described, in embodiments other types of unique identifiers including statistically unique identifiers, substantially unique identifiers, and others, may be employed.

Accessing a ratings identifier in a fragment at 210 may include examining fragments available on different streams or different connections. In one example, an identifier may be analyzed in an instance of a fragment available on an input stream from which the fragment is to be accepted or rejected. In another example, an identifier may be analyzed in an instance of a fragment available on a second input stream that is different from the input stream on which the fragment is to be accepted or rejected. For example, the fragment may be analyzed on a low bandwidth stream that does not sustain actually presenting or recording the received content. If the rating for the content analyzed on the low bandwidth stream is unacceptable, then corresponding content on higher bandwidth streams may be blocked. In another embodiment, if the rating for the content analyzed on the low bandwidth stream is acceptable, then the corresponding content may be allowed to be received on a higher bandwidth (e.g., video quality) stream. This embodiment may depend on the second input stream and the input stream being aligned or synchronized. For example, the streams may be synchronized with respect to f-MP4 fragment alignment. In different embodiments, being synchronized may include being received at the same time, or being received at known offset times. For example, corresponding fragments in a low-resolution stream may be 1 f-MP4, 100 ms, or other intervals ahead of or behind fragments in a high-resolution stream.

Accessing a ratings identifier at 210 may also include examining things other than live input streams. For example, accessing and analyzing at 210 may include accessing the fragment in a data store. The data store may be used to buffer fragments to facilitate non-real-time processing.

Method 200 also includes, at 220, selectively rejecting or accepting an identified fragment. Accepting a fragment may include writing the fragment to a memory, to a disk drive, to a solid state drive, or to another device or location. Accepting a fragment may also include displaying the fragment or allowing the fragment to pass through to another device or process. In one embodiment, a fragment may be selectively rejected or accepted based, at least in part, on the ratings identifier. For example, fragments whose ratings identifier match a desired ratings profile may be accepted while fragments whose ratings identifier does not match the desired ratings profile will not be accepted. Matching a desired ratings profile may include making an exact match, or may include matching to within an acceptable tolerance.

In different embodiments, a fragment may be identified based solely on its rating, on a combination of the rating and a time at which the fragment was received, on a combination of the rating and a source from which the fragment was received, on a combination of the rating, a time at which the fragment was received, and a source from which the fragment was received, and on other criteria or combinations of criteria. However, the different combinations will include the ratings identifier that is located in the fragment to be recorded.

In different embodiments, method 200 may be performed on a device that is doing the identifying and accepting, or method 200 may be performed on a device other than the device that is doing the rejecting or accepting. Therefore, method 200 may include controlling devices including, but not limited to, a television, a digital video recorder, a computer, a laptop computer, a tablet computer, a personal electronic device, and a smart phone to identify and reject or accept the fragment. In another embodiment, method 200 may include controlling a service (e.g., cloud service) to identify the fragment and then controlling a device to reject or accept the fragment based, at least in part, on an identification or control signal provided by the cloud service.

Figure 3:
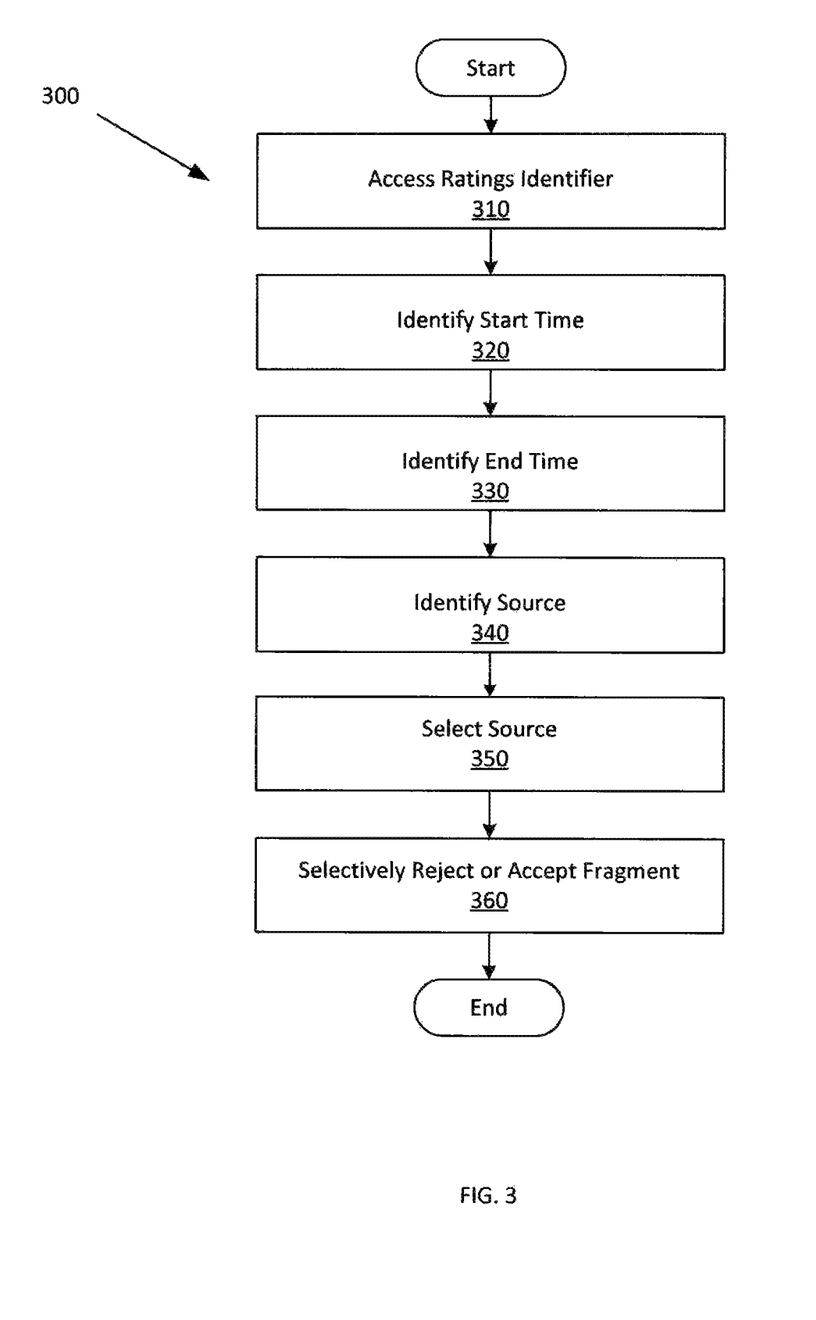
FIG. 3 illustrates an example method associated with content carried ratings based control.

FIG. 3 illustrates an example method 300 associated with content carried ratings based control. Method 300 includes accessing a ratings identifier at 310. In one example, accessing the ratings identifier at 310 includes analyzing a fragmented MPEG-4 (f-MP4) fragment to determine a value of a ratings identifier encoded in a universally unique identifier (UUID) field in the fragment. Accessing the ratings identifier may involve examining a fragment in a first stream from which the f-MP4 fragment is to be received, in a second stream other than the stream from which the f-MP4 fragment is to be received, or in a data store. When a fragment is to be accepted from a stream other than the stream from which the fragment was initially received and analyzed, then the fragments may be received on sources having other quality levels that are aligned on fragment boundaries. The accessing and analysis can be performed on different devices. Thus, determining whether to accept the fragment may be decided on devices including, but not limited to, a television, a digital video recorder, a computer, a laptop computer, a tablet computer, a personal electronic device, a smart phone, a service, and a cloud-based service.

Method 300 also includes, at 320, identifying a start time. Identifying the start time may include receiving an input from a user, receiving an input from a service, process, or thread, analyzing a database or table or other data, and other actions. Rather than use the start time as a hard boundary at which time blocking will begin, the start time can be used as a recommendation or as a hint concerning when fragments are to be rejected and thus for when content carried ratings based scrutiny may be performed. For example, a stream may be examined starting at a recommended time and then selective blocking or acceptance may begin based on ratings identifiers. This may preserve processing resources during times when desired content is unexpected. Method 300 also includes, at 330, identifying an end time. Identifying the end time may include receiving an input from a user, receiving an input from a service, process, or thread, analyzing a database or table or other data, and other actions. Once again, rather than using the end time as a hard boundary at which time fragments will once again be received, the end time can be used as a recommendation or as a hint concerning when fragments are to be accepted and thus for when content carried ratings based scrutiny may be halted. For example, a stream may be examined until a recommended end time or some other signal is received, and then selective blocking or acceptance may end. This may preserve processing resources during times when desired content is unexpected.

Method 300 also includes, at 340, identifying a source from which fragments are expected. A source may be, for example, a stream, a file, or other entity from which fragments can be received. Identifying the source may include receiving an input from a user, receiving an input from a service, process, or thread, analyzing a database or table or other data, and other actions. Identifying the source, start time, and end time, may facilitate allocating reception streams or allocating processes or threads to operate on certain reception streams. This may facilitate managing bandwidth consumption.

Method 300 also includes, at 350, selecting a source from which fragments are to be accepted. The source may be selected based on the identification made at 340. Different sources may be selected as a function of bandwidth, cost, security, or other reasons.

Method 300 also includes, at 360, selectively accepting the fragment based, at least in part, on the ratings identifier encoded in the UUID field. In one example, accepting the fragment at 360 includes controlling a device (e.g., television, computer, laptop computer, tablet computer, personal electronic device, smart phone, a cloud-based service) to write the fragment to a storage device or data store. Accepting the fragment at 360 may also include displaying the fragment or allowing the fragment to pass through to another device. Whether a particular fragment is accepted may depend on a combination of the ratings identifier encoded in the UUID field, a time at which the fragment was received, and a source from which the fragment was received.

While FIG. 3 illustrates various actions occurring in serial, it is to be appreciated that various actions illustrated in FIG. 3 could occur substantially in parallel. By way of illustration, a first process could access and analyze a ratings identifier, a second process could identify start/end time and source, and a third process could accept or reject a fragment. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described herein including methods 200 or 300. While executable instructions associated with the above methods are described as being stored on a computer-readable storage medium, it is to be appreciated that executable instructions associated with other example methods described herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

Figure 4:
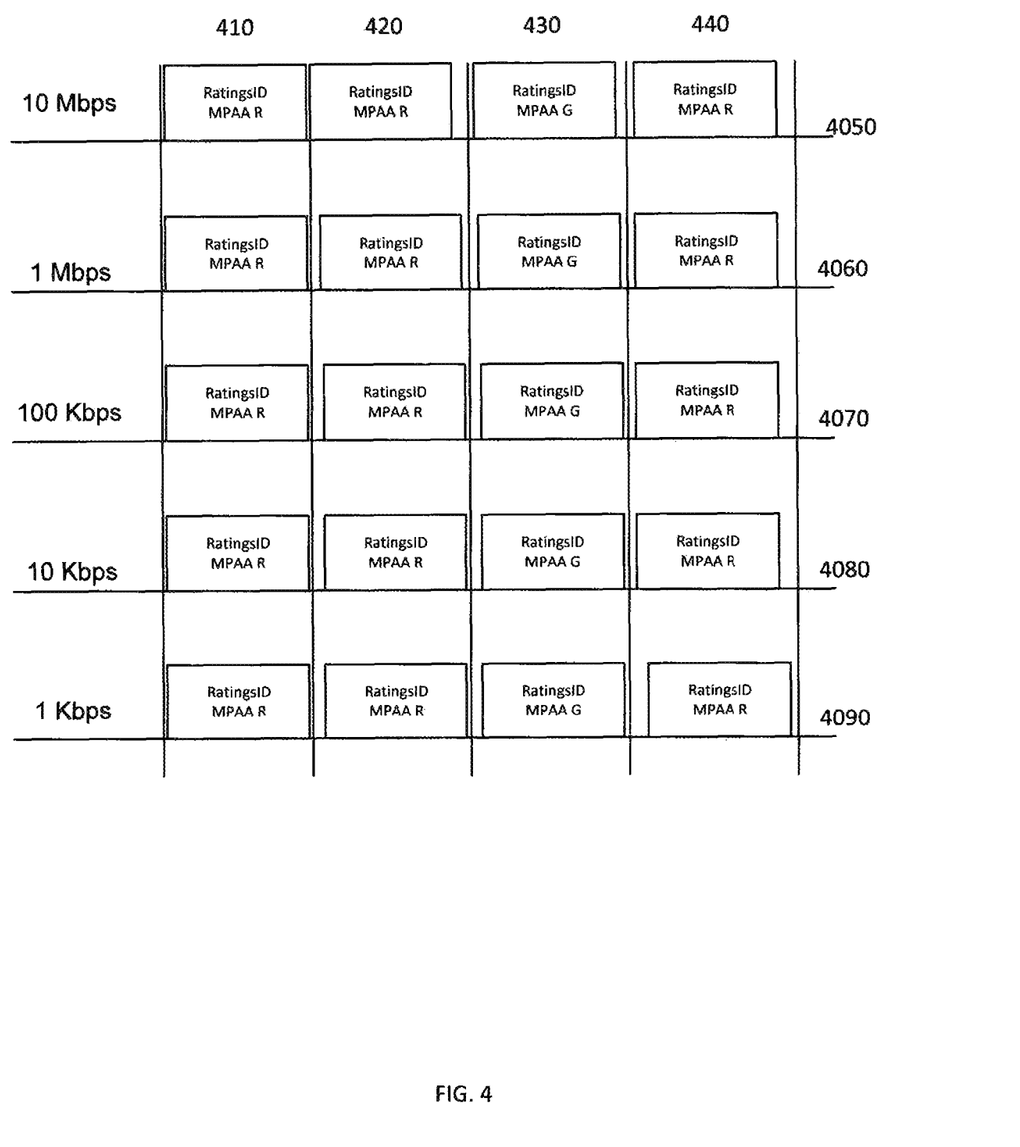
FIG. 4 illustrates example communication streams.

FIG. 4 illustrates example communication streams and aligned slots on those communication streams. The communication streams have different bandwidths. For example, stream 4050 may be able to deliver content at 10 Mbps, stream 4060 may be able to deliver content at 1 Mbps, stream 4070 may be able to deliver content at 100 Kbps, stream 4080 may be able to deliver content at 10 Kbps, and stream 4090 may only be able to deliver content at 1 Kbps. While stream 4090 may be unsuitable for receiving video content, stream 4090 may be adequate for receiving fragment metadata. Thus, content may be received on stream 4090 and the ratings identifier carried in the content may be used to control whether the corresponding fragment in the corresponding time slot will be rejected or accepted from a higher bandwidth stream (e.g., video quality stream 4050). By way of illustration, a fragment may be delivered during time slot 410. The ratings identifier may indicate that the fragment is to be rejected. Thus the fragment may be ignored. The ratings identifier may have been identified using data acquired on stream 4090. Another fragment may be delivered during time slot 420. Once again, the ratings identifier may indicate that the fragment is to be rejected and the fragment will be discarded. Another fragment may be delivered during time slot 430. This fragment may have a ratings identifier that indicates that the fragment is to be accepted. Therefore, the corresponding fragment present on stream 4050 may be accepted. Since fragments to be accepted are likely to appear in order, the next fragment received on stream 4050 during, for example, time slot 440, may be examined for its ratings identifier and, if the ratings identifier matches a desired discretion threshold, then the fragment will also be accepted. While FIG. 4 illustrates corresponding fragments being aligned in the same time slots, in embodiments the fragments may be synchronized without being aligned. For example, corresponding fragments on a high bandwidth stream may be delayed and offset from corresponding fragments on a lower bandwidth stream.

Figure 5:
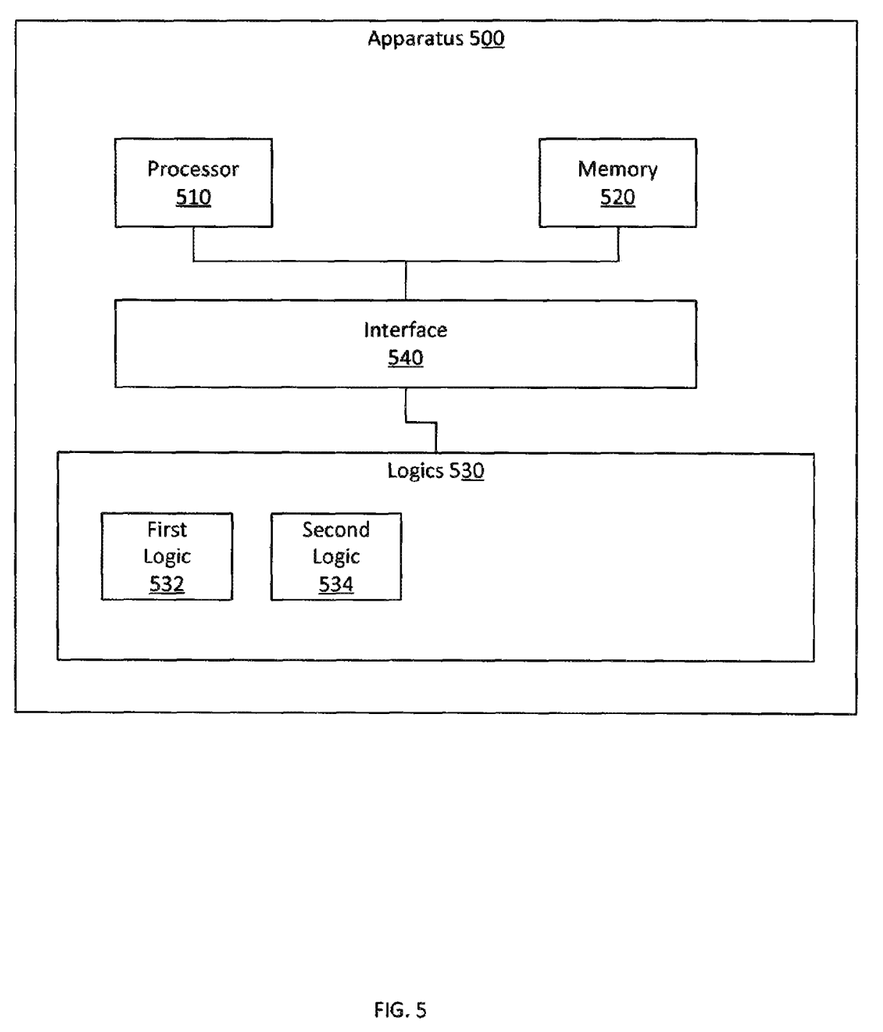
FIG. 5 illustrates an example apparatus configured to perform content carried ratings based control.

FIG. 5 illustrates an apparatus 500 that includes a processor 510, a memory 520, a set 530 of logics, and an interface 540 that connects the processor 510, the memory 520, and the set 530 of logics. Apparatus 500 may be, for example, a television, a digital video recorder (DVR), a computer, a laptop computer, a tablet computer, a personal electronic device, a smart phone, or other device that receives content.

In one embodiment, the apparatus 500 may be a general purpose computer that has been transformed into a special purpose computer through the inclusion of the set 530 of logics. The set 530 of logics may be configured to facilitate content carried ratings based control. In one embodiment, the methods described herein may be performed by apparatus 500. Apparatus 500 may interact with other apparatus, processes, and services through, for example, a computer network.

The set 530 of logics may include a first logic 532 that is configured to identify a fragment to reject or accept based on information located in the fragment. In one embodiment, the first logic 532 is configured to identify the rating based on a ratings identifier located in the fragment. The fragment may be, for example, a fragmented MPEG-4 fragment.

The set 530 of logics may also include a second logic 534 that is configured to reject the fragment. In one embodiment, the second logic 534 may be configured to accept or reject the fragment from a communication source from which the first logic 532 initially received the fragment. In another embodiment, the second logic 534 may be configured to accept or reject the fragment from a communication source other than the communication source from which the first logic 532 received the fragment.

In one embodiment, memory 520 may store fragments so that the fragments can be examined later. Thus, in one embodiment, the first logic 532 is configured to examine the memory 520 to identify fragments to reject or accept. The first logic 532 may act in response to different initiating actions. In one example, the first logic 532 is configured to examine the memory 520 in response to a user initiated action, a scheduled action, a periodic action, an event-driven action, or another action.

In different embodiments, some processing may be performed on the apparatus 500 and some processing may be performed by an external service or apparatus. Thus, in one embodiment, apparatus 500 may also include a communication circuit that is configured to communicate with an external source to facilitate receipt or transmission of items including, but not limited to, identifiers of fragments to be accepted or acceptance control signals. In one example, the first logic 532 may be configured to identify fragments to accept or reject on the apparatus 500. But in another example, the first logic 532 may be configured to request ratings analysis from a service located off the apparatus 500.

Figure 6:
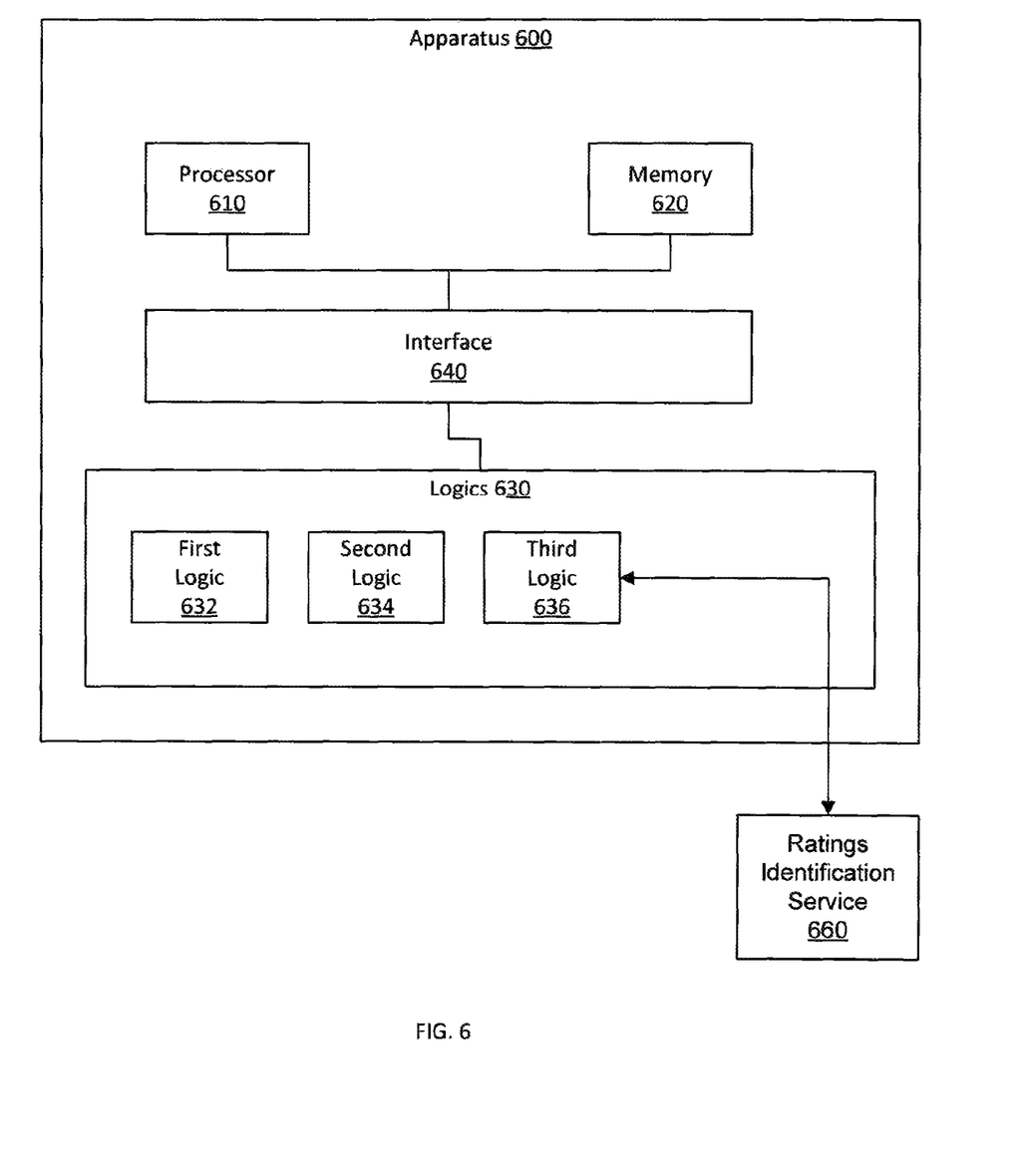
FIG. 6 illustrates an example apparatus configured to perform content carried ratings based control.

FIG. 6 illustrates an apparatus 600 that is similar to apparatus 500 (FIG. 5). However, apparatus 600 includes an additional logic 636. Third logic 636 may be configured to receive a control signal from a service 660 located external to the apparatus 600. The third logic 636 may examine the signal and then control the second logic 634 to accept or reject the fragment based, at least in part, on the control signal. The service 660 may be, for example, a ratings identification service.

Figure 7:
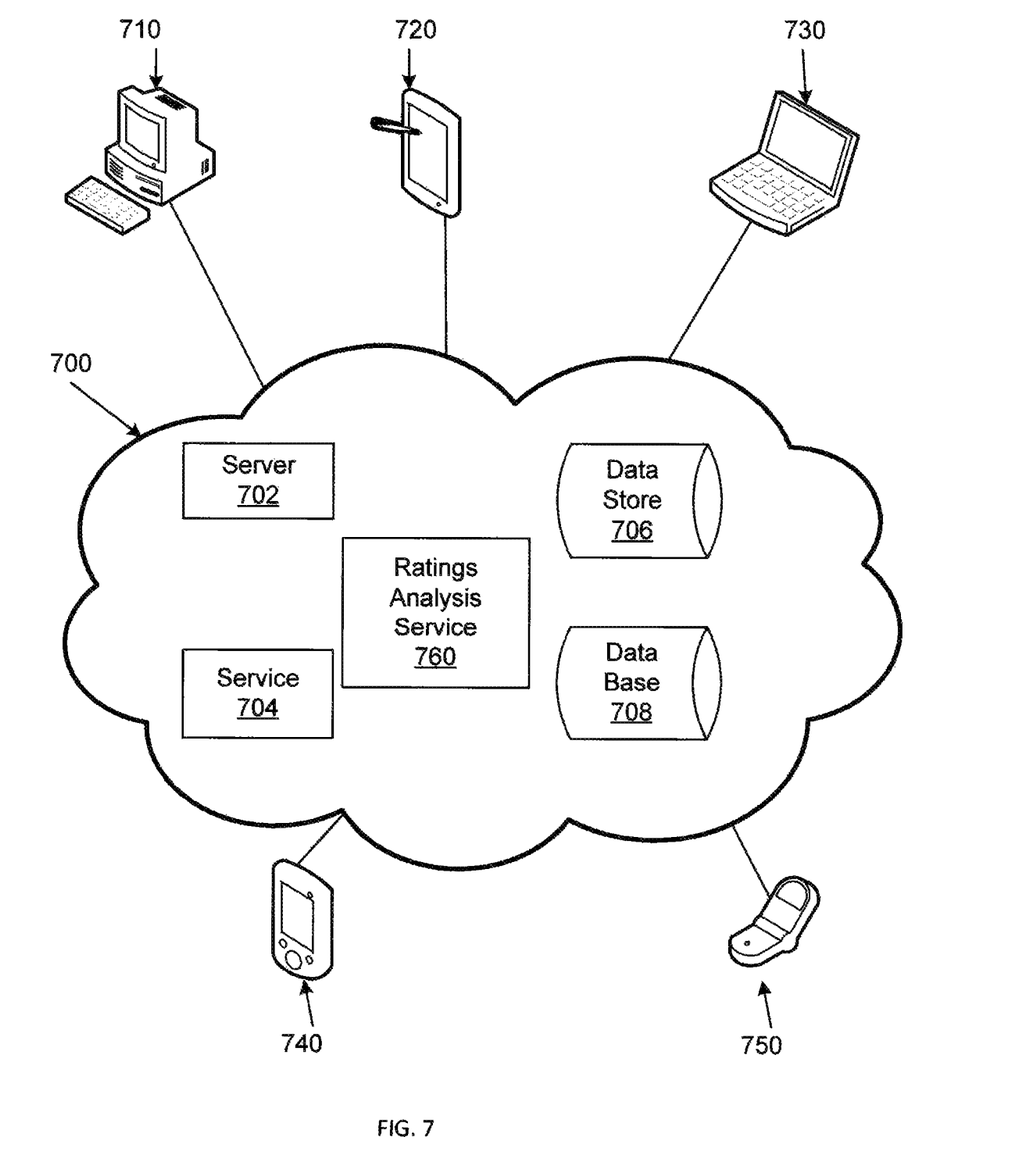
FIG. 7 illustrates an example cloud operating environment.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices, over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example ratings analysis service 760 residing in the cloud 700. The ratings analysis service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in cloud 700 and may, therefore, be used by the ratings analysis service 760.

FIG. 7 illustrates various devices accessing the ratings analysis service 760 in the cloud 700. The devices include a computer 710, a tablet 720, a laptop computer 730, a personal digital assistant 740, and a mobile device (e.g., cellular phone, satellite phone) 750. The ratings analysis service 760 facilitates examining a ratings identifier located in a fragment and identifying the fragment as a fragment to be accepted or rejected. Thus, it is possible that different users at different locations using different devices may access the ratings analysis service 760 through different networks or interfaces. In one example, the ratings analysis service 760 may be accessed by a mobile device 750. In another example, portions of ratings analysis service 760 may reside on a mobile device 750.

Figure 8:
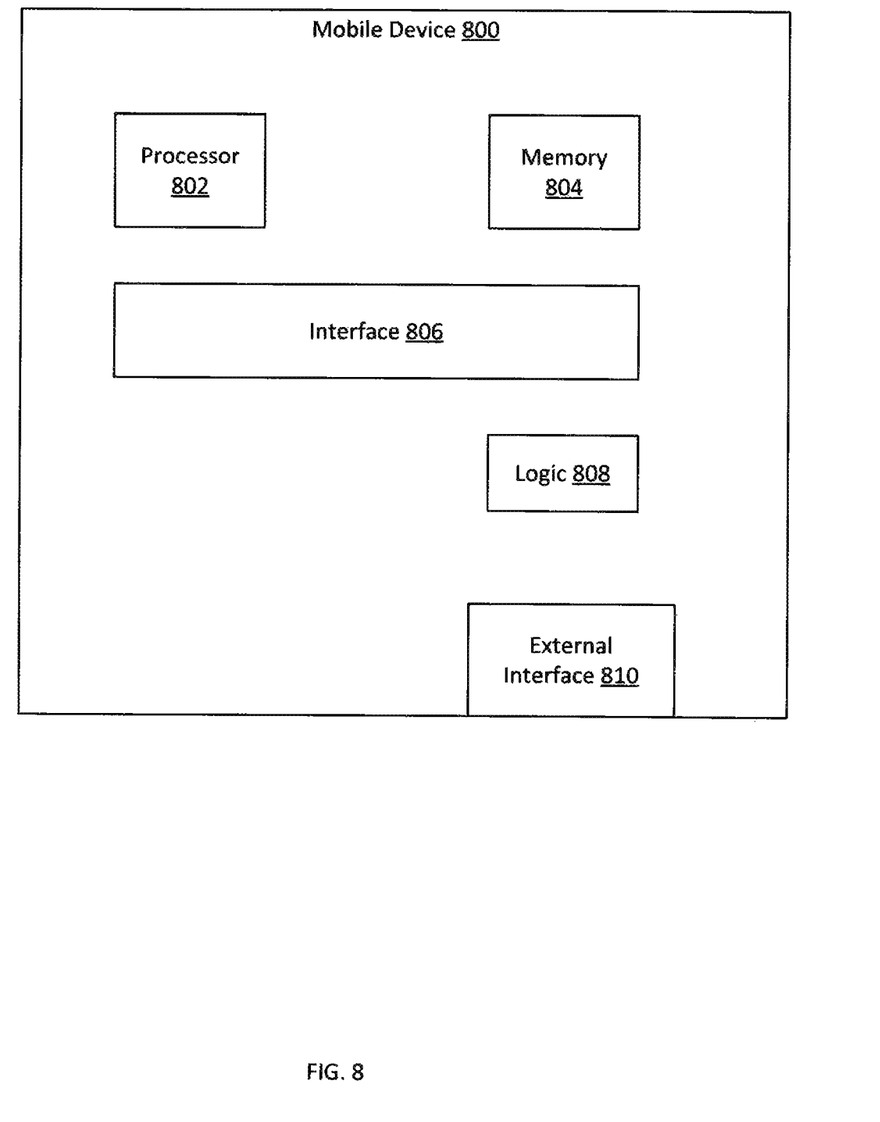
FIG. 8 illustrates an example mobile computing device configured to perform content carried ratings based control.

FIG. 8 illustrates an example mobile device 800. Mobile device 800 includes a processor 802, a memory 804, a logic 808, and an external interface 810 that may be connected by an interface 806. Mobile device 800 may be, for example, a cellular telephone, a network telephone, a satellite telephone, or other device. Generally describing an example configuration of the mobile device 800, the processor 802 may be a variety of various processors including dual microprocessor and other multi-processor architectures. The memory 804 may include volatile memory or non-volatile memory. Non-volatile memory may include, for example, read only memory (ROM), programmable ROM (PROM), and other memory. Volatile memory may include, for example, random access memory (RAM), dynamic RAM (DRAM), and other memory. The memory 804 can store an operating system that controls and allocates resources of the mobile device 800. The memory 804 may also store fragments, ratings identifiers, or fragment identifiers. The ratings identifiers or fragment identifiers may be used to control whether a fragment is accepted or rejected.

The interface 806 may be a single internal bus interconnect architecture or other bus or mesh architectures. While a single bus is illustrated, it is to be appreciated that the mobile device 800 may communicate with various devices, logics, and peripherals using other busses (e.g., PCIE, 1394, USB, Ethernet). The interface 806 can be types including, for example, a memory bus, a memory controller, a peripheral bus, an external bus, a crossbar switch, or a local bus.

The mobile device 800 can operate in a network environment and thus may be connected to a network through network devices via the external interfaces 810. The mobile device 800 may be logically connected to remote computers through the network and the network devices. Through the network, the mobile device 800 may also be connected to services (e.g., service 760, FIG. 7) provided in the cloud (e.g., cloud 700, FIG. 7). Networks with which the mobile device 800 may interact include, but are not limited to, a local area network (LAN), a wide area network (WAN), a telephony network, a telephony system, a cellular system, a satellite system, and other networks.

Mobile device 800 may include a special purpose logic 808 that is configured to provide a functionality for the mobile device 800. For example, logic 808 may provide a client for interacting with a service (e.g., service 760, FIG. 7), or for performing ratings identifier analysis or acceptance/rejection control.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, and C, (e.g., the data store may store only A, only B, or only C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . ABB . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof including multiple instances of A, B, or C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   accessing a ratings identifier encoded as a universally unique identifier (UUID) in a fragmented MPEG-4 (f-MP4) fragment, where the UUID has a plurality of bits, where a first subset of the plurality of bits is associated with violence, where a second subset of the plurality of bits is associated with language, where a third subset of the plurality of bits is associated with nudity, and where a fourth subset of the plurality of bits is associated with subject matter, and
   selectively accepting or rejecting the fragment as a function of the ratings identifier, where the ratings identifier is accessed from a corresponding instance of the fragment received on a second video input stream different from a first video input stream from which the fragment is to be accepted or rejected,
   where the second video input stream and the first video input stream carry the same content at different quality levels, the second video input stream carrying the content at a lower quality level than the first video input stream from which the fragment is to be accepted or rejected.

2. The method of claim 1, comprising:
   accessing the ratings identifier from an instance of the fragment received on the second video input stream.

3. The method of claim 1, where all f-MP4 fragments in the second video input stream have a ratings identifier encoded as a UUID.

4. The method of claim 1, comprising:
   accessing the ratings identifier from an instance of the fragment stored in a data store.

5. The method of claim 1, comprising:
   selectively accepting the fragment based on a combination of the ratings identifier and a time at which the fragment was received.

6. The method of claim 1, comprising:
   selectively accepting the fragment based on a combination of the ratings identifier and a source from which the fragment was received.

7. The method of claim 1, comprising:
selectively accepting the fragment based on a combination of the ratings identifier, a time at which the fragment was received, and a source from which the fragment was received.

8. The method of claim 1, comprising:
controlling one of, a television, a computer, a laptop computer, a tablet computer, a personal electronic device, and a smart phone to access and analyze the ratings identifier and to selectively accept or reject the fragment.

9. The method of claim 1, comprising:
controlling a cloud service to access and analyze the ratings identifier; and
controlling one of, a television, a computer, a laptop computer, a tablet computer, a personal electronic device, and a smart phone to accept or reject the fragment based, at least in part, on the access and analysis performed by the cloud service.

\* \* \* \* \*